Figure 2:
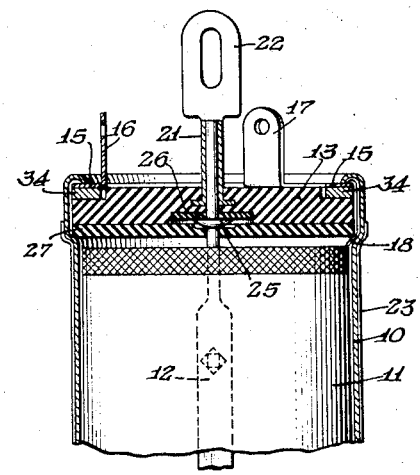

June 24, 1941.   P. McK. DEELEY   2,246,933
ELECTRICAL CAPACITOR
Filed April 5, 1939

INVENTOR.
Paul McKnight Deeley
BY
ATTORNEY.

UNITED STATES PATENT OFFICE 2,246,933

ELECTRICAL CAPACITOR

Paul McKnight Deeley, Plainfield, N. J., assignor to Cornell-Dubilier Electric Corporation, South Plainfield, N. J., a corporation of Delaware Application April 5, 1939, Serial No. 266,076

4 Claims. (Cl. 175—315)

The present invention relates to electrical capacitors and among the objects of the invention is to provide an improved terminal arrangement for such capacitors.

The terminal arrangement proposed by the present invention is particularly well adapted for the construction of dry electrolytic capacitors although it will become obvious that the proposed improvement may be employed with equal advantage in wet electrolytic capacitors or any other type of capacitor presenting a similar problem of mounting and terminal arrangement. As is well known, dry electrolytic capacitors contain a more or less viscous or pasty electrolyte disposed between the electrodes, the electrolyte being usually held within the pores of a fibrous spacer or separator, whereas in wet capacitors a liquid electrolyte solution is used in a sealed container occupying the space between adjacent capacitor electrodes.

In the construction of electrolytic capacitors in the past, more particularly in capacitors of the dry type, it has been customary to provide a terminal tab extending from an electrode of the capacitor by cutting cross-wise of the electrode foil a strip approximately ½" wide and by bending this strip so as to project from the capacitor section. This tab is electrically secured to a terminal such as wire or screw terminal by riveting or in any other suitable manner, and the joint between the tab and the terminal protected from the action of the electrolyte by thoroughly covering it with a wax, pitch or any other suitable material to prevent corrosion by the electrolyte at the tab-to-terminal connection. Such a structure is satisfactory for capacitors employing plain or smooth foil in which case the space occupied by the capacitor is ample to facilitate the connecting operation during manufacture.

In the capacitors extensively used at present employing roughened or etched foil whereby the size of the anode may be reduced to ⅕ or less the size of the anode of the previous type employing non-etched foil, the above construction has been found to be highly unsuited and impractical. As an example, an 8 mfd. 450 volt capacitor using plain foil requires an anode approximately 20" long by 3" wide whereby the end surface of the convolute capacitor section obtained by spirally winding the anode strip together with a cathode strip and interposed fibrous spacers into a roll has a diameter of about ¾". On the other hand, when using etched foil in a capacitor designed for the same operating voltage and electrical capacity, the end surface area is approximately ⅕ of the above value and it is readily seen that in this case the space available is insufficient to allow for a tab ½" wide and enabling the riveting and other assembly operations to be carried out in an easy and economical manner.

Accordingly, an object of the present invention is to provide an improved and economical mounting and terminal arrangement for an electrical capacitor. With this object of the invention in view the non-flattened portion of a wire terminal or tab is passed through a hollow metal piece or sleeve such as a rivet or eyelet mounted in an insulating cap or block closing an open end of the container or can housing the capacitor section. By swaging or otherwise deforming this sleeve a liquid tight seal and intimate engagement and electrical connection is effected with the extending portion of the wire tab. As will be appreciated, a terminal structure of this type besides greatly simplifying the assembly and manufacturing operation requires a relatively small mounting space thus allowing a great number of terminals to be mounted at a closer distance as required in the case of multiple capacitor units comprising a plurality of anodes or cathodes each connected to a separate outside terminal. The metal sleeve or eyelet which is preferably of film forming material such as aluminum may serve as a terminal or the end of the wire terminal may be extended sufficiently to serve as the connecting means for the capacitor. Alternatively, a further terminal tab or lug of desired shape which may consist of different material such as copper may be secured to the sleeve or eyelet.

As is well known, electrolytic capacitors when overloaded or subjected to adverse operating conditions become hot whereby gases are developed within the container or can housing the capacitor section. If this condition continues for a more or less prolonged time it may lead to a rapid deterioration or complete destruction of the capacitor. To avoid this danger, there is usually provided a vent in the casing or can housing the capacitor section. This vent is designed to open at a predetermined excess gas pressure developed within the capacitor to allow excess gas to escape from within the can to the outside. One generally known form of vent consists of a punctured rubber cap or diaphragm suitably mounted in a portion of the container wall preferably the cover or closure disc and adapted to become distended by the action of the excess pressure so as to open the puncture and allow the undesired gases to escape.

This type of vent has various disadvantages which under circumstances may impair its proper function and reliability after prolonged use. Such a disadvantage is the fact that the operation is substantially impaired with age on account of the deterioration or hardening of the rubber. Another disadvantage is due to the puncture or pin hole in the rubber diaphragm becoming clogged with foreign matter or precipitated salts from the electrolyte resulting in a substantial impairment or complete interruption of the effectiveness of such a vent construction.

Accordingly, a further object of the invention is to provide a novel safety vent for electrolytic devices.

Still another object is to provide a vent which is highly reliable and positive in operation.

Figure 1:
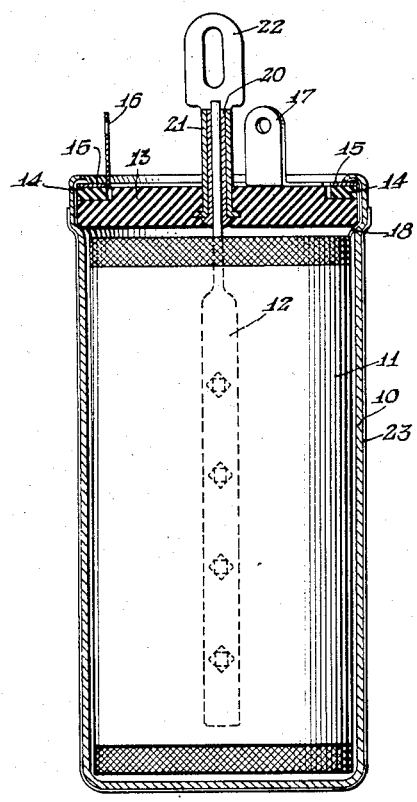
Figure 3:
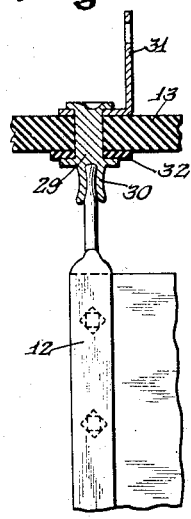
Figure 4:
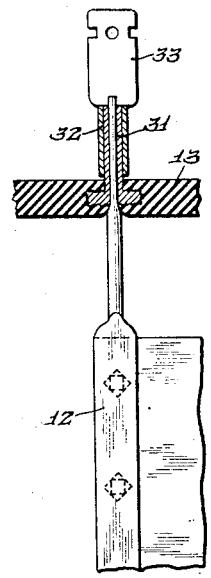

The above and further objects and aspects of the invention will become more apparent from the following detailed description taken with reference to the accompanying drawing forming parts of this specification and wherein:

Figure 1 is a vertical cross-section through an electrolytic capacitor constructed in accordance with the invention, Figure 2 is a fractional view of a capacitor shown in Figure 1 showing a modified terminal arrangement, Figures 3 and 4 are further partial views illustrating modified terminal arrangements embodying the improvements of the invention.

Similar reference numerals identify similar parts throughout the different views of the drawing.

Referring to the drawing, Figure 1 shows a dry electrolytic capacitor comprising a metal can 10 closed at one end and having inserted therein a convolute capacitor section 11 comprising two or more electrode strips separated by suitable spacing strips such as gauze or paper in a manner well known to those skilled in the art. The can 10 is formed with a shoulder or bead near its open end to provide a seat for an insulating end piece or closure disc 13. The latter consists preferably of moldable material such as a condensation product of phenol and formaldehyde known by the trade name of "Bakelite" although other insulating materials may be used as will be obvious. The disc 13 has a peripheral depression adapted to receive an annular gasket 14 of soft easily deformable material such as rubber. Overlying the top surface of the rubber gasket 14 is a metal ring 15 having one or more projecting lugs as shown at 16 and 17 to facilitate mounting of the capacitor upon a support or panel member such as the chassis of a radio set. The disc 13, the gasket 14 and the mounting ring 15, after having been assembled together are clamped and firmly held in position by beading or spinning the edge of the can against the ring 15, also effecting thereby a liquid tight seal between the disc 13 and the can 10.

The capacitor shown may be of the commonly known type wherein the cathode or unfilmed electrode is connected to the metal can serving as the negative terminal of the capacitor. To this end a terminal lead or tab 18 projecting from the cathode and which may be integral with the cathode foil or secured thereto in any suitable manner is disposed within the gap between the spun over edge of the can 10 and the superposed disc, gasket, and mounting ring in such a manner that the terminal tab 18 is firmly pressed against the wall of the can and held in intimate electrical contact with the can and the ring 15 when the end of the can is spun over in the manner described.

The positive or anode terminal tab consists of a unitary wire member 12 of film forming metal such as aluminum having a flattened portion connected to the anode such as by a staking or riveting operation or in any other suitable manner adapted to ensure efficient electrical contact between the tab and the electrode and to provide sufficient mechanical support. There is further provided in the embodiment shown a hollow metal piece such as a rivet or sleeve 20 preferably consisting of film forming material such as aluminum and mounted or anchored in the disc 13 in any suitable manner such as by embedding it in the disc during the molding operation when using a disc consisting of "Bakelite" or other moldable material. The head of the rivet 20 insures a firm hold in the disc and if a sleeve is used the same may be provided with a flange or equivalent lateral extension (see Figure 4) to afford efficient anchorage in the disc or top member 13. The metal piece or sleeve 20 projects beyond the disc 13 and in order to effect connection with the wire tab 12 the upper non-flattened portion of the tab is inserted in the sleeve or rivet 20 and the latter deformed such as by swaging it by means of a suitable tool in such a manner as to effect an intimate engagement resulting in efficient electrical contact between the sleeve and wire tab. The projecting wire may be of sufficient length to serve as a connecting terminal for the capacitor or a separate soldering terminal 22 or the like may be provided having a sleeve 21 fitting over the sleeve or rivet 20 and mounted or anchored in the disc 13 similar to the sleeve 20. In this case, all the three members; that is, the wire tab 12 and the sleeves 20 and 21 will be forced into tight engagement by the deforming or swaging operation. The terminal lug 22 in this case may consist of a different metal such as copper as there is no longer any danger of the electrolyte coming into contact with the connecting joint between the lug and the sleeve or rivet 20 thus removing any possibility of corrosion at this joint.

The mounting lugs 16 and 17 which may be of any desired number and arranged in a desired relative position greatly facilitate the mounting of the capacitor upon a panel member or support by passing the lugs through suitable openings in the panel and twisting or deforming them to lock and secure the capacitor to the panel.

In connection with the use of certain aluminum can or metal encased electrolytic capacitors of the above described or any other type the circuit wherein the condenser is used may be of such that where the can of the capacitor forms one of the terminals, it may become advisable or necessary to electrically insulate the can from a metal chassis or base upon which the capacitor is mounted. For this purpose it is customary to provide an insulating washer between the can and the panel. This expedient however does not suffice in many cases because the can may then be at an elevated electrical potential in relation to the panel or chassis or to other exposed or accessible circuit components. Such a condition may constitute an actual hazard in the use of such an apparatus.

According to a further feature of the invention, the aforementioned drawback is eliminated by coating the exterior surface of the metal can or container housing the capacitor section with a thin layer of insulating material such as cellulose acetate, resin, varnish preferably a phenolic condensation product such as "Bakelite" varnish, rubber or any other material having suitable characteristics to provide a closely bonded insulating film or coating shown at 23 in the drawing.

Referring to the drawing, Figure 2, there is shown a modified terminal construction according to the invention wherein the rivet or sleeve 20 is dispensed with and the wire tab directly inserted in the sleeve 21 of the terminal or soldering lug 22. For this purpose the latter is molded or otherwise mounted in the insulating cap or disc 13. In order to prevent corrosion by the electrolyte coming in contact with the joint between the terminal tab and the sleeve 21, the disc 13 is formed with a central recess on its underside adapted to receive a washer 26 of easily deformable material such as rubber. The wire tab 12 has an enlarged portion or boss 25 abutting against the washer 26 in the assembled condition while a further insulating disc 27 is placed against the underside of the disc 13 in such a manner as to deform the washer 26 when the elements are clamped together during the beading or spinning of the edge of the container against the mounting ring 15. In order to facilitate assembly of the tab 12 and disc 27 the latter is preferably constructed with a radial slot extending from the outer periphery to the center to permit of lateral insertion of the non-flattened portion of the tab. In the example shown this slot would be at right angle to the plane of the drawing.

Referring to Figure 3 there is shown an embodiment of a terminal construction wherein the metal piece mounted in the disc 13 has the form of a solid rivet having a terminal lug 31 clamped between its outer flange and the disc 13 and having a rubber washer interposed between its inner flange and the disc 13. The inner end of the rivet is formed with a tubular extension or sleeve adapted to receive the non-flattened end of the wire tab 12 and being deformed such as by swaging it to effect a firm mechanical and electrical connection between the tab 12 and the rivet 29. In this case the latter should be of film forming metal such as aluminum similar to the anode to prevent corrosion at the connecting joint.

The embodiment according to Figure 4 is similar to Figure 1 and comprises a terminal sleeve 31 having a flange embedded or molded in the disc 13 spaced sufficiently from the inner surface of the disc to avoid contact with the electrolyte within the can, and a separate terminal lug 33 having a tubular extension or sleeve 32 fitting over the sleeve 31. The sleeves 31 and 32 and the non-flattened portion of the wire tab are connected and held in firm engagement by a deforming operation in a manner similar as in the foregoing constructions.

In order to relieve the capacitor of excess gases developed during operation there is provided an improved vent consisting of a metal alloy ring 34, Figure 2, taking the place of the rubber washer 14 in Figure 1. The former consists of a metal alloy of such composition as to melt at a predetermined temperature thereby allowing excess gas developed within the capacitor can to escape to the outside. As an example a combination of lead, tin and bismuth has been found to give satisfactory results combined in various proportions to secure a desired melting temperature at which the vent starts to operate under any given operating conditions. The following table indicates several combinations of such an alloy and their respective melting temperatures suited for the purposes of the invention:

| | | | | | | | | | | |
|---|---|---|---|---|---|---|---|---|---|---|
| Lead..............percent.. | 32.0 | 25.8 | 25.0 | 43.0 | 33.3 | 10.7 | 50.0 | 35.8 | 20.0 | 70.9 |
| Tin..............do.... | 15.5 | 19.8 | 15.0 | 14.0 | 33.3 | 23.1 | 33.0 | 52.1 | 60.0 | 9.1 |
| Bismuth..........do.... | 52.5 | 54.4 | 60.0 | 43.0 | 33.3 | 66.2 | 17.0 | 12.1 | 20.0 | 20.0 |
| Melting temperature..°F.. | 204.8 | 213.8 | 257.0 | 262.4 | 293.0 | 298.4 | 321.8 | 357.8 | 359.6 | 453.2 |

Other satisfactory alloys may embody zinc, cadmium, magnesium, and aluminum in combination with lead, tin or bismuth.

A simple method of producing an alloy of this type consists in using an ordinary steel pot in which is fused at first the metal of highest melting point whereupon the other metals are added in succession corresponding to their melting points; that is, the metal with the lowest melting point being added last. The alloy is thoroughly mixed and then molded in an ordinary metal die into a desired shape or it may be rolled into sheet form and then cut. Alternatively, the final shape may be obtained by a pressing or extruding operation in a manner well understood.

In electrolytic capacitors using plates or metal foil of film forming material such as aluminum, tantalum, titanium, etc., or an alloy of two or more such metals, the electrodes are generally subjected to anodic treatment or oxidation to form an insulating film acting as the dielectric in the finished capacitor. The film obtained by the anodic treatment or electrolytic formation apparently consists substantially of aluminum oxide and/or hydrated forms of aluminum oxide. The film surface possesses a certain porosity which increases as the temperature of the electrodes is increased. This increase of the porosity of the film surface is obviously due to the different coefficient of expansion of the film surface and the conducting plate or foil forming the electrode. As a result of the increased porosity under high temperatures additional electrical losses are produced which in turn will entail a further temperature increase. This will result in a rapid and accumulative deterioration and final destruction of the capacitor unless means are provided to reliably and efficiently relieve the capacitor of the excess gas at a definite excess temperature. As will be appreciated, a vent of the type according to the invention is admirably suited for this purpose by enabling a critical adjustment of the operating temperature by the proper choice of the alloy combination used for any given operating conditions.

Another reason for the improved effectiveness and reliability of a vent construction according to the invention is the fact that the gasket is in intimate contact with the metal container housing the capacitor section. Thus when the capacitor becomes hot for any reason of overloading or otherwise, the generated heat is quickly conducted by the metal of the container to the gasket alloy material. In consequence thereof, a prompt functioning at a determined excess temperature is insured thereby preventing any dangerous condition immediately at its inception. In other words, in the proposed vent construction the cause itself of trouble that is excess heat due to overloading determines the operation of the vent rather than the gas pressure as the result of such cause as in the case of the previous vent structures such as discussed hereinbefore.

As will be evident from the above the invention is not limited to the specific construction and arrangement of parts and methods of assembly disclosed herein for illustration but that numerous modifications and variations may be resorted to differing from the exemplifications presented and coming within the broad scope and spirit of the invention as defined in the appended claims. The specification and drawing are accordingly to be regarded in an illustrative rather than a limiting sense.

I claim:

1. In combination with an electrolytic capacitor comprising a metal can and at least one filmed electrode mounted therein, a molded insulating disc liquid-tightly secured to an opening of said can, a metallic sleeve fixedly molded in said disc and projecting outwardly from said disc, a wire tab having one end secured to said electrode and having its opposite end inserted in said sleeve, said sleeve and tab being of the same material as said electrode, a metallic terminal element having a flanged sleeve fitting over said first sleeve being also fixedly molded in said disc, both said sleeves being deformed into firm mechanical and electrical contact with each other and said tab.

2. In combination with an electrolytic capacitor comprising a metal can and at least one filmed electrode mounted therein, a molded insulating disc liquid-tightly secured to an opening of said can, a first metallic sleeve having a flanged end firmly molded in said disc and having its other end projecting outwardly from said disc, a wire tab having one end secured to said electrode and having its opposite end inserted in said sleeve, said sleeve and tab being of the same metal as said electrode, and a terminal element of different metal having a flanged sleeve fitting over said first sleeve also being molded in said disc, both said sleeves being crimped into firm mechanical and electrical contact with each other and said tab, and means for preventing access of electrolyte in said can to the joint between said sleeves.

3. The combination with an electrolytic capacitor comprising a container and a capacitor section mounted in said container, of a molded insulating closure member secured to an opening of said container, a metallic sleeve embedded in said closure member and projecting outwardly therefrom, an electrical conductor having one end secured to an electrode of said capacitor section and having its opposite end inserted in said sleeve, said conductor and said sleeve being substantially of the same material as said electrode, and a terminal element having a sleeve fitting over said first sleeve and being also embedded in said closure member, both said sleeves being deformed into mechanical and electrical engagement with each other and said conductor.

4. A terminal structure for an electrolytic device mounted in a container comprising, a molded insulating member liquid-tightly secured to an opening of said container, a metallic sleeve embedded in said insulating member and projecting outwardly from said container, an electrical conductor having one end secured to an electrode of said device and having its opposite end inserted in said sleeve, said conductor and sleeve being substantially of the same material, and a terminal element having a sleeve fitting over said first sleeve and being also molded in said insulating member, both said sleeves being deformed into firm mechanical and electrical engagement with each other and said conductor.

PAUL McKNIGHT DEELEY.